US 9,893,745 B2

(12) United States Patent
Smaini et al.

(10) Patent No.: US 9,893,745 B2
(45) Date of Patent: Feb. 13, 2018

(54) HIGH EFFICIENCY TRANSMITTER ARCHITECTURES FOR A LOCALIZED SINGLE-CARRIER FREQUENCY DIVISION MULTIPLE ACCESS TRANSCEIVER

(71) Applicant: Apple Inc., Cupertino, CA (US)

(72) Inventors: Lydi Smaini, San Jose, CA (US); Konstantinos Sarrigeorgidis, Sunnyvale, CA (US); Tarik Tabet, Los Gatos, CA (US); Syed Aon Mujtaba, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 80 days.

(21) Appl. No.: 14/990,711

(22) Filed: Jan. 7, 2016

(65) Prior Publication Data

US 2016/0218900 A1   Jul. 28, 2016

Related U.S. Application Data

(60) Provisional application No. 62/107,073, filed on Jan. 23, 2015.

(51) Int. Cl.
*H04B 1/04* (2006.01)
*H04W 88/02* (2009.01)
(Continued)

(52) U.S. Cl.
CPC ....... *H04B 1/04* (2013.01); *H04B 2001/0491* (2013.01); *H04L 5/0044* (2013.01);
(Continued)

(58) Field of Classification Search
CPC . H04B 1/04; H04B 2001/0491; H04L 27/361; H04L 27/362; H04W 88/02; H04W 72/04
See application file for complete search history.

(56) References Cited

U.S. PATENT DOCUMENTS 6,154,661 A * 11/2000 Goldburg ............... H01Q 1/246
370/277
8,249,538 B2 * 8/2012 Jin .......................... H04B 1/30
345/169

(Continued)

FOREIGN PATENT DOCUMENTS

EP   1895731 A1   3/2008

*Primary Examiner* — Mohamed Kamara
(74) *Attorney, Agent, or Firm* — Meyertons Hood Kivlin Kowert & Goetzel, P.C.; Jeffrey C. Hood

(57) ABSTRACT

This disclosure relates to a system and method for generating single-carrier frequency division multiple access (SC-FDMA) transmissions using a high efficiency architecture. According to some embodiments, frequency resources allocated for a transmission may be determined. The allocated frequency resources may have a bandwidth less than a channel bandwidth of a frequency channel of the transmission, and may be centered around a particular frequency. The frequency may be offset from the center frequency of the channel. A baseband signal located around DC corresponding to the channel center frequency may be generated. The baseband signal may be up-converted to an RF signal using a local oscillator tuned to the frequency around which the allocated frequency resources are centered. The RF signal may be transmitted.

25 Claims, 8 Drawing Sheets

(51) Int. Cl.
    *H04L 5/00*     (2006.01)
    *H04L 27/36*    (2006.01)
(52) U.S. Cl.
    CPC .......... *H04L 27/361* (2013.01); *H04L 27/362* (2013.01); *H04W 88/02* (2013.01)

(56) References Cited

U.S. PATENT DOCUMENTS

| | | |
|---|---|---|
| 2007/0004465 A1* | 1/2007 | Papasakellariou .. H04W 52/325 455/571 |
| 2008/0049851 A1 | 2/2008 | Nangia et al. |
| 2008/0116986 A1* | 5/2008 | Frantzeskakis ...... H03C 3/0925 332/144 |
| 2013/0039368 A1 | 2/2013 | Schwartz et al. |
| 2014/0301262 A1 | 10/2014 | Homchaudhuri et al. |
| 2015/0078483 A1 | 3/2015 | Sun et al. |
| 2015/0139358 A1* | 5/2015 | Asuri .................... H04L 27/361 375/297 |
| 2015/0146640 A1* | 5/2015 | Baldemair .......... H04L 27/2666 370/329 |

* cited by examiner

HIGH EFFICIENCY TRANSMITTER ARCHITECTURES FOR A LOCALIZED SINGLE-CARRIER FREQUENCY DIVISION MULTIPLE ACCESS TRANSCEIVER

PRIORITY INFORMATION

This application claims priority to U.S. provisional patent application Ser. No. 62/107,073, entitled "High Efficiency Transmitter Architectures for a Localized Single-Carrier Frequency Division Multiple Access Transceiver," filed Jan. 23, 2015, which is hereby incorporated by reference in its entirety as though fully and completely set forth herein.

FIELD

The present application relates to wireless devices, and more particularly to a system and method for generating single-carrier frequency division multiple access (SC-FDMA) transmissions using a high efficiency architecture.

DESCRIPTION OF THE RELATED ART

Wireless communication systems are rapidly growing in usage. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), IEEE 802.16 (WiMAX), Bluetooth, and others.

In LTE, single-carrier frequency division multiple access (SC-FDMA) is used in the uplink while orthogonal frequency division multiple access (OFDMA) is used in the downlink. Typically, SC-FDMA signals are shifted to their allocated resource blocks in the frequency domain in a process which results in a data path having a bandwidth much greater than the bandwidth of the allocated resource blocks themselves, particularly if the allocated resource blocks are close to an outer edge of the frequency channel in which they are located.

SUMMARY

Embodiments are presented herein of methods for cellular devices to perform localized SC-FDMA transmissions, and of devices configured to implement the methods.

In some instances, the frequency resources used for a transmission from a transmitting device to a receiving device may only occupy a subset of the total frequency resources of a frequency channel used for wireless communication between the transmitting and receiving devices. Additionally, at least in some circumstances it may be possible for those frequency resources to be offset from the center frequency of the frequency channel. SC-FDMA communication in LTE is one example of such a paradigm in which resource allocations that are offset from the center frequency of a frequency channel are possible According to the techniques disclosed herein, it may be possible to provide a transmitter architecture capable of operating in a highly efficient manner in such (and potentially other) circumstances. For example, an architecture may be used in which a baseband signal remains located (e.g., centered) around DC (e.g., rather than shifting the baseband signal such that the center frequency of the frequency channel is located around DC) through any frequency domain processing, and in which the baseband signal is up-converted to an RF signal using an oscillator tuned to (e.g., centered on) the frequency resouces actually allocated for the transmission (e.g., rather than tuning the oscillator to the center frequency of the frequency channel). In other words, shifting the signal to the frequency resources allocated for the transmission may be performed in the time domain rather than in the frequency domain.

Numerous additional possible RF architecture features/signal processing techniques may be used in conjunction with such an RF architecture, if desired. For example, a cartesian RF architecture (e.g., including any or all of envelope tracking, digital to analog conversion, low pass filtering, quadrature mixing, use of a linear power amplifier, etc.) may be used in some embodiments. Alternatively, a polar RF architecture (e.g., including any or all of Cartesian to Polar conversion, a phase locked loop (PLL), a switching or digital amplifier, amplitude encoding, etc.) may be used, if desired. Note that in some instances, an architecture including digital RF front end components at least through the power amplification stage may be possible according the present disclosure, potentially allowing for baseband and RF front end to be implemented on a single integrated circuit.

The techniques described herein may be implemented in and/or used with a number of different types of devices, including but not limited to cellular base stations, cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings, in which.

Figure 1:
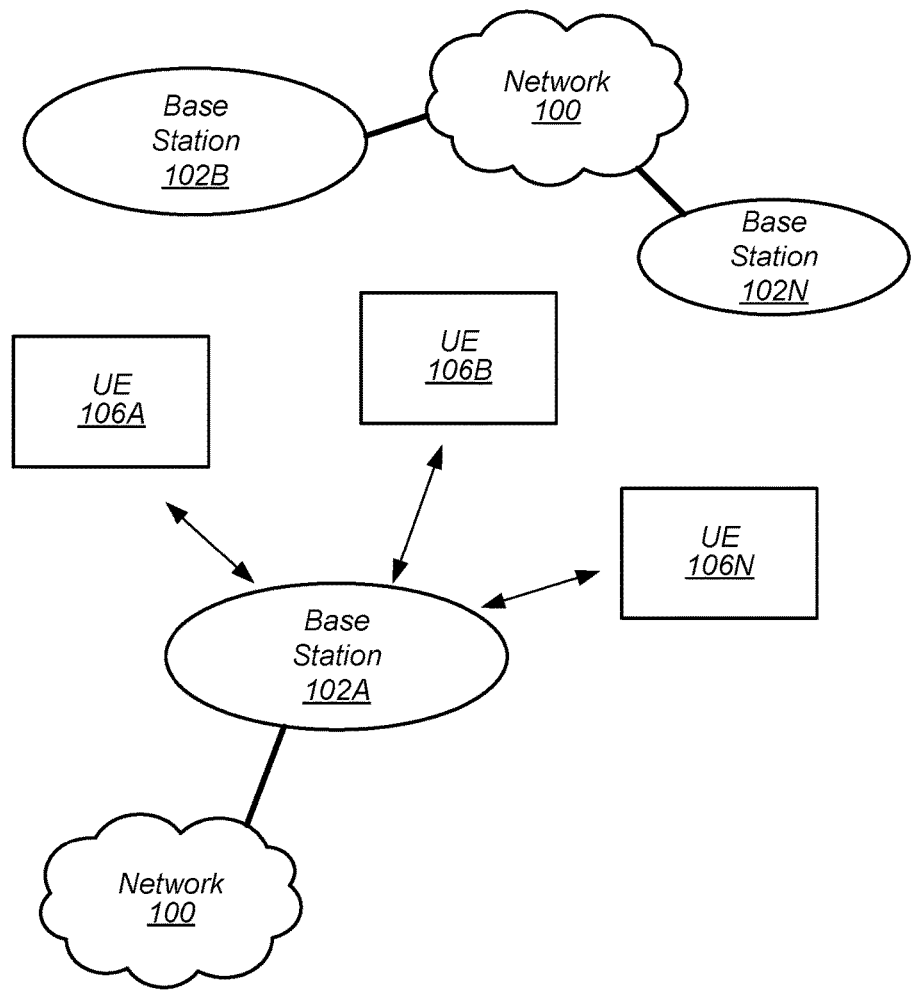
FIG. 1 illustrates an exemplary (and simplified) wireless communication system, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g., smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel bandwidths may be variable (e.g., depending on device capability, band conditions, etc.). For example, LTE may support scalable channel bandwidths from 1.4 MHz to 20 MHz. In contrast, WLAN channels may be tens of MHz (20 to 160 MHz for WiFi) wide while Bluetooth channels may be around 1 MHz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
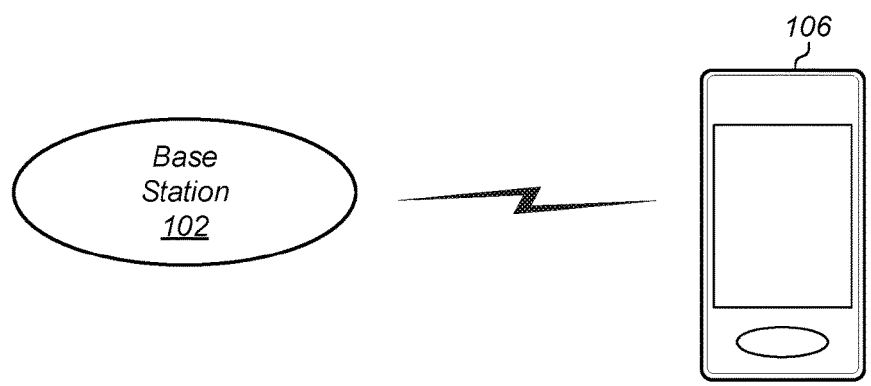
FIG. 2 illustrates a base station (BS) in communication with a user equipment (UE) device, according to some embodiments.

FIGS. 1 and 2—Communication System

FIG. 1 illustrates an exemplary (and simplified) wireless communication system, according to some embodiments. It is noted that the system of FIG. 1 is merely one example of a possible system, and embodiments may be implemented in any of various systems, as desired.

As shown, the exemplary wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station 102A may be a base transceiver station (BTS) or cell site, and may include hardware that enables wireless communication with the UEs 106A through 106N. The base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (WCDMA, TD-SCDMA), LTE, LTE-Advanced (LTE-A), HSPA, 3GPP2 CDMA2000 (e.g., 1×RTT, 1×EV-DO, HRPD, eHRPD), Wi-Fi, WiMAX etc.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a wide geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100, according to the same wireless communication technology as base station 102A and/or any of various other possible wireless communication technologies. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

Note that a UE 106 may be capable of communicating using multiple wireless communication standards. For example, a UE 106 may be configured to communicate using a wireless networking (e.g., Wi-Fi) and/or peer-to-peer wireless communication protocol (e.g., BT, Wi-Fi peer-to-peer, etc.) in addition to at least one cellular communication protocol (e.g., GSM, UMTS (WCDMA, TD-SCDMA), LTE, LTE-A, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102 (e.g., one of the base stations 102A through 102N), according to some embodiments. The UE 106 may be a device with cellular communication capability such as a mobile phone, a hand-held device, a wearable device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include programmable hardware elements such as ASIC (Application Specific Integrated Circuit) that are configured to perform any of the method embodiments described herein, or any portion of any of the method embodiments described herein.

The UE 106 may include one or more antennas for communicating using one or more wireless communication protocols or technologies. In one embodiment, the UE 106 might be configured to communicate using either of CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio transceiver may include any combination of a digital baseband processor, analog RF signal processing circuitry (e.g., including filters, mixers, oscillators, amplifiers, etc.), or digital signal processing (DSP) circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may specifically include circuitry for performing single carrier frequency division multiple access (SC-FDMA) communication. For example, the UE 106 may be capable of utilizing SC-FDMA communication for uplink communication as part of communicating according to the LTE radio access technology.

In some embodiments, the UE 106 may include separate (and possibly multiple) transmit and/or receive chains (e.g., including separate RF and/or digital radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 1×RTT (or LTE or GSM), and separate radios for communicating using each of Wi-Fi and Bluetooth. Other configurations are also possible.

Figure 3:
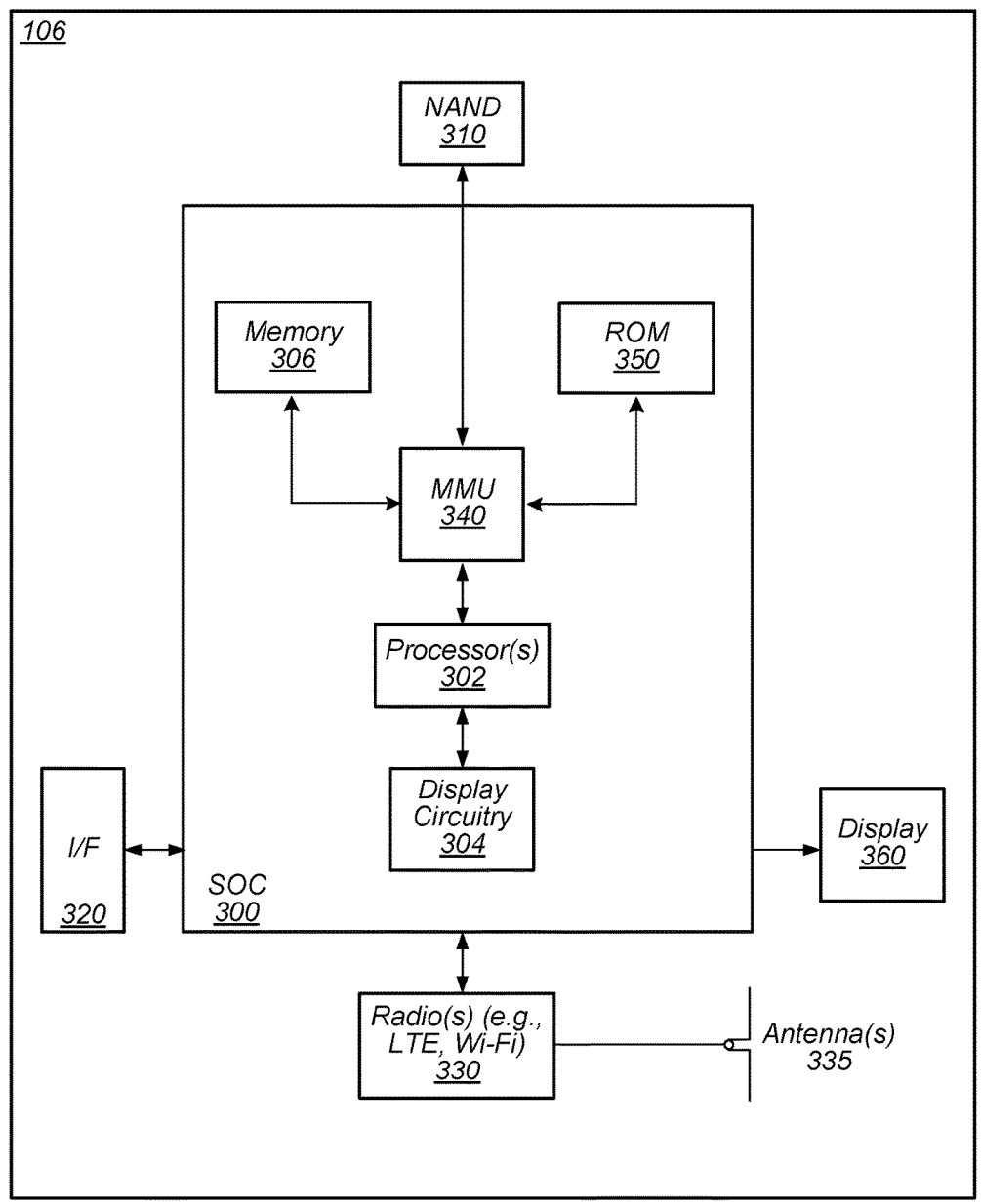
FIG. 3 illustrates an exemplary block diagram of a UE, according to some embodiments.

FIG. 3—Exemplary Block Diagram of a UE

FIG. 3 illustrates an exemplary block diagram of a UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry (e.g., radio) 330 (e.g., for LTE, Wi-Fi, GPS, etc.). Note that while the UE 106 is illustrated as including one or more radios separate from the SOC, it is also possible that one or more radios (or radio components) may be integrated into the SOC in addition or as an alternative, as an advanced SOC used in a UE may include embedded memory, processors, digital signal processing, and/or one or more (potentially different) radio(s) integrated into a single chip (generally in CMOS technology), e.g., for low power consumption and platform optimization. In other words, an SOC may also integrate a radio or multiple radios if desired, potentially including combination chips with any or all of Wi-Fi, Bluetooth, GPS, FM, and/or other communication capabilities.

The UE device 106 may include at least one antenna (and possibly multiple antennas, e.g., for MIMO and/or for implementing different wireless communication technologies, among various possibilities), for performing wireless communication with base stations and/or other devices. For example, the UE device 106 may use antenna(s) 335 to perform the wireless communication. As noted above, the UE 106 may be configured to communicate wirelessly using multiple wireless communication technologies in some embodiments.

As described further subsequently herein, the UE 106 may include hardware and/or software components for performing SC-FDMA communications, such as described herein with reference to, inter alia, FIG. 4. The processor 302 of the UE device 106 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit). Alternatively (or in addition) the processor 302 of the UE device 106, in conjunction with one or more of the other components 300, 304, 306, 310, 320, 330, 335, 340, 350, 360 may be configured to implement part or all of the features described herein, such as the features described herein with reference to, inter alia, FIG. 4.

FIG. 4—Flowchart

Figure 4:
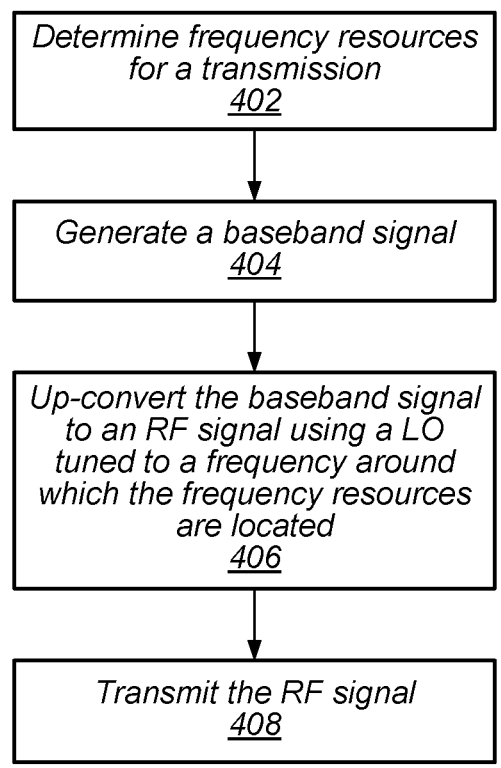
FIG. 4 is a communication flow diagram illustrating an exemplary method for performing localized SC-FDMA transmissions, according to some embodiments.

FIG. 4 is a flowchart diagram illustrating a method for generating and transmitting radio frequency (RF) waveforms. The method of FIG. 4 may be implemented by a UE 106 (e.g., such as illustrated in and described with respect to FIGS. 1-3), or more generally in conjunction with any of the computer systems or devices shown in the above Figures, among other devices, as desired.

In various embodiments, some of the elements of the method shown may be performed concurrently, in a different order than shown, substituted for by other elements, or may be omitted. Additional elements may also be performed as desired. As shown, the method may operate as follows.

In 402, frequency resources for a transmission may be determined. The frequency resources may include a signal bandwidth located around a particular frequency. The signal bandwidth may be less than the channel bandwidth of a frequency channel on which the transmission will be performed, and furthermore, at least in some instances, the frequency around which the frequency resources are centered may be offset from the center frequency of the frequency channel.

For example, UE may be configured to operate according to LTE, and the frequency resources may include one or more resource blocks (RBs) according to LTE. In such a case, the UE may first establish or join a cell according to LTE with a cellular base station. The cell may operate on a particular frequency channel having a particular bandwidth. As part of its cellular communication with the base station, then, the UE may receive an uplink grant for uplink LTE communication with the cellular base station. The uplink grant may include an RB allocation for a single carrier frequency division multiple access (SC-FDMA) uplink transmission, as may for example be typical in LTE. The RB allocation may be located around a frequency which is different than (e.g., shifted or offset from) the center frequency of the channel by a frequency offset.

In 404, a baseband signal may be generated. The baseband signal may have the determined signal bandwidth (e.g., depending on the number of RBs allocated), and may be positioned in frequency such that the frequency resources associated with the RB allocation are located around DC. In some embodiments, the center frequency of the frequency resources associated with the RB allocation may be located at or near DC, so that the center frequency of the frequency channel is offset from DC.

In other words, the baseband signal may be located around a first baseband frequency corresponding to the frequency around which the allocated frequency resources are located; a second baseband frequency corresponding to the center frequency of the frequency channel may be offset from the first baseband frequency.

In 406, the baseband signal may be up-converted to generate an RF signal. The up-conversion may use a local oscillator (LO) which is tuned to the frequency around which the frequency resources are centered/located. In other words, the LO may be tuned to a frequency which is offset from the center frequency (e.g., by the frequency offset) of the frequency channel.

Note that any of a variety of possible RF architectures may be used in conjunction with the up-conversion.

As a first possibility, a Cartesian RF architecture may be used, for example including any or all of envelope tracking, digital to analog conversion, low pass filtering, quadrature mixing, and use of a linear power amplifier, to generate the RF signal.

As a second possibility, a Polar RF architecture may be used. For example Cartesian to Polar conversion may be performed to convert the quadrature components I and Q of the baseband signal to a baseband phase portion and an amplitude portion.

For narrowband signals (as may be typical, at least in some instances, if the baseband signal bandwidth corresponds to the actual frequency allocation before up-conversion by a LO tuned to a frequency around which the frequency resources are centered), the quadrature mixing and LO used for up-conversion in the Cartesian RF architecture can be replaced by a phase locked loop (PLL) in conjunction with the Polar RF architecture, if desired, and used to up-convert the baseband phase portion to an RF phase portion and to drive a high-efficiency switching power amplifier or digital power amplifier.

In the Polar RF architecture, the amplitude portion may either be converted to analog and used to control amplification of the RF signal using a switching power amplifier, or may remain digital and used to control amplification of the RF signal using a digital power amplifier, according to various embodiments. Furthermore, if desired, the amplitude portion may be encoded (e.g., delta-sigma modulation, thermometric, dynamic element matching, etc.) prior to driving a digital power amplifier.

Note further that, at least in some instances, it may be possible to implement an entirely digital RF front-end architecture through the power amplification stage. For example, using the above-described examples of a Polar RF architecture with a digital PA, a digital PLL, etc., it may be possible to provide an integrated circuit (e.g., CMOS chip) with both baseband and RF front end, which may be capable of implementing the method of FIG. 4.

Note additionally that, since in the method of FIG. 4 frequency shifting to allocated/determined frequency resources is performed after baseband processing and in the time domain, it may be the case (at least in some instances) that Fourier Transform (e.g., Discrete Fourier Transform (DFT) or Fast Fourier Transform (FFT)) and Inverse Fourier Transform (e.g., Inverse Discrete Fourier Transform (IDFT) or Inverse Fast Fourier Transform (IFFT)) may not be needed, and may thus not be performed (e.g., even in the case of a SC-FDMA signal) when generating the baseband signal. Up-sampling (and possibly interpolation) may be performed as an alternative technique to modify the sampling rate of the signal to an appropriate final sampling rate, if desired.

In 408, the RF signal may be transmitted. For example, the RF signal may be transmitted as an SC-FDMA signal as part of an uplink LTE communication in response to an uplink grant, such as previously described.

FIGS. 5-16—Additional Information

FIGS. 5-16 and the information provided herein below in conjunction therewith are provided by way of example of various considerations and details relating to possible systems with which the method of FIG. 4 may be implemented, and are not intended to be limiting to the disclosure as a whole. Numerous variations and alternatives to the details provided herein below are possible and should be considered within the scope of the disclosure.

Figure 5:
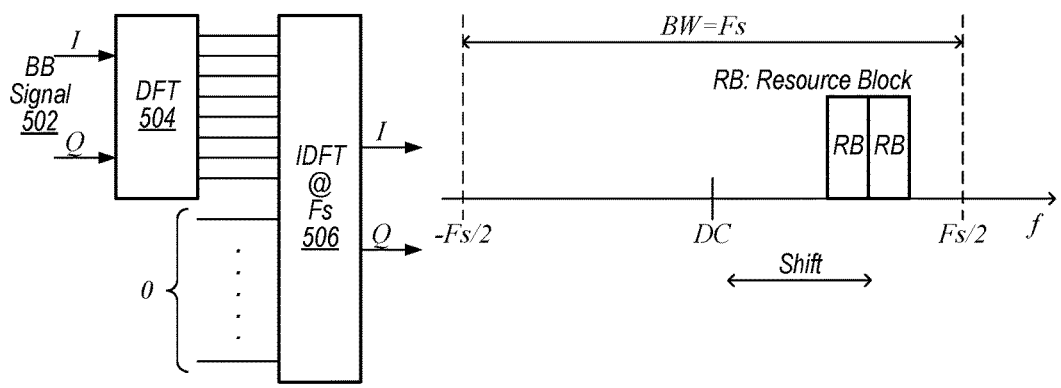
FIGS. 5-15 are block diagrams illustrating various exemplary SC-FDMA transmission architectures, according to some embodiments.

FIG. 5 illustrates a typical SC-FDMA baseband configuration according to some embodiments. As shown, a baseband (BB) signal 502 is input to a Discrete Fourier Transform (DFT) block 504. The signal frequency allocation (shift) to the frequency allocation imposed by the network is then performed in the frequency domain, before being input to an Inverse Discrete Fourier Transform (IDFT) block 506. In this case the final up-conversion to RF is performed using a local oscillator centered around the channel center frequency. Thus, although the baseband signal bandwidth could be much less than the channel bandwidth (e.g., 1 RB=180 kHz in LTE, while Fs=30.72 MHz for a 20 MHz channel), in this case after IDFT the data path has to deal with a potential maximum bandwidth equal to Fs (e.g., the channel bandwidth and the guard-bands).

Figure 6:
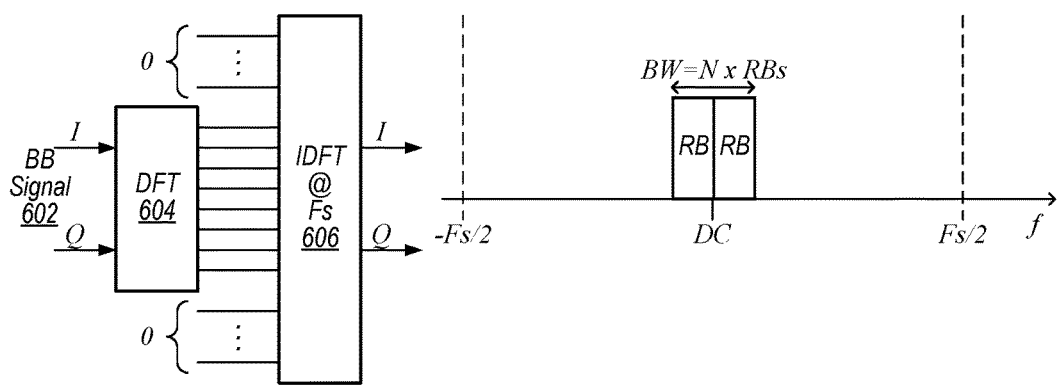

FIG. 6 illustrates an alternative SC-FDMA baseband configuration, such as might be used in conjunction with the method of FIG. 4, in some embodiments. As shown, a baseband signal 602 is input to a DFT block 604, but is not shifted in the frequency domain. Instead, the baseband signal remains located around DC (in this example, centered) as it is input to the IDFT block 606. Thus, in this case, the data path useful bandwidth depends only on the number of RBs rather than the full channel bandwidth. This may be much more efficient for digital signal processing (e.g., may reduce power consumption/conserve battery). The useful signal may then be shifted to the correct frequency position of the allocated RBs within the channel bandwidth after the IDFT (i.e., in the time domain), by tuning/centering the LO used for up-conversion to that frequency.

Figure 7:
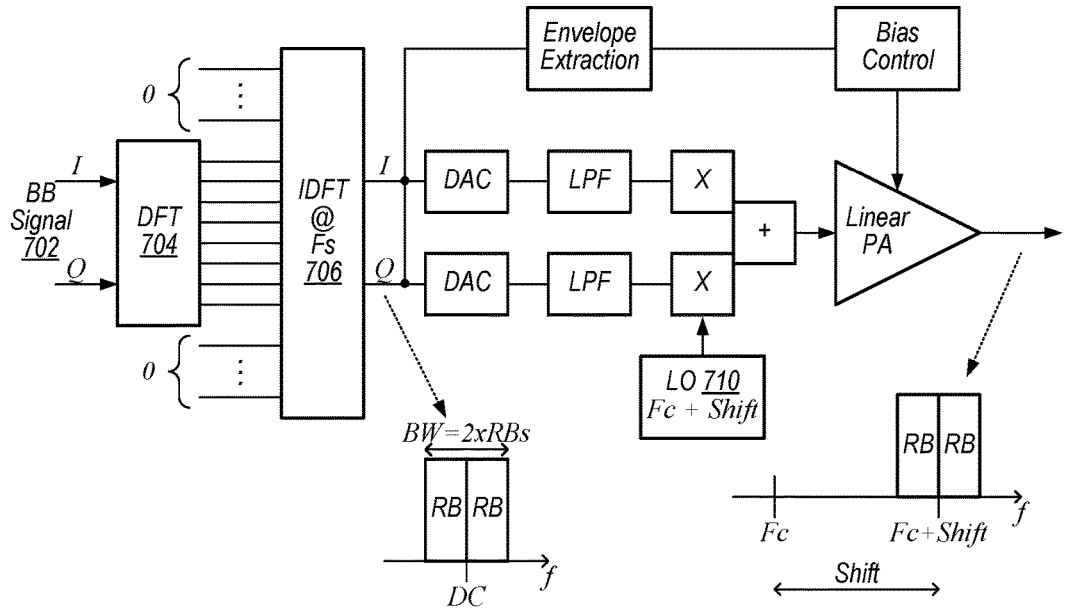

FIG. 7 illustrates a Cartesian RF architecture which may be used in conjunction with the baseband configuration illustrated in and described with respect to FIG. 6. As shown, a baseband signal 702 is input to a DFT block 704 and remains located around DC as it is input to the IDFT block 706. As further shown, the architecture may utilize envelope tracking (ET); by leaving the allocated RBs centered before the IDFT and performing the frequency shift to the appropriate frequency within the channel during up-conversion (e.g., using LO 710 centered at Fc+shift, as shown), efficiency can be increased by improving the envelope path circuitry efficiency (e.g., due to the signal bandwidth reduction).

Figure 8:
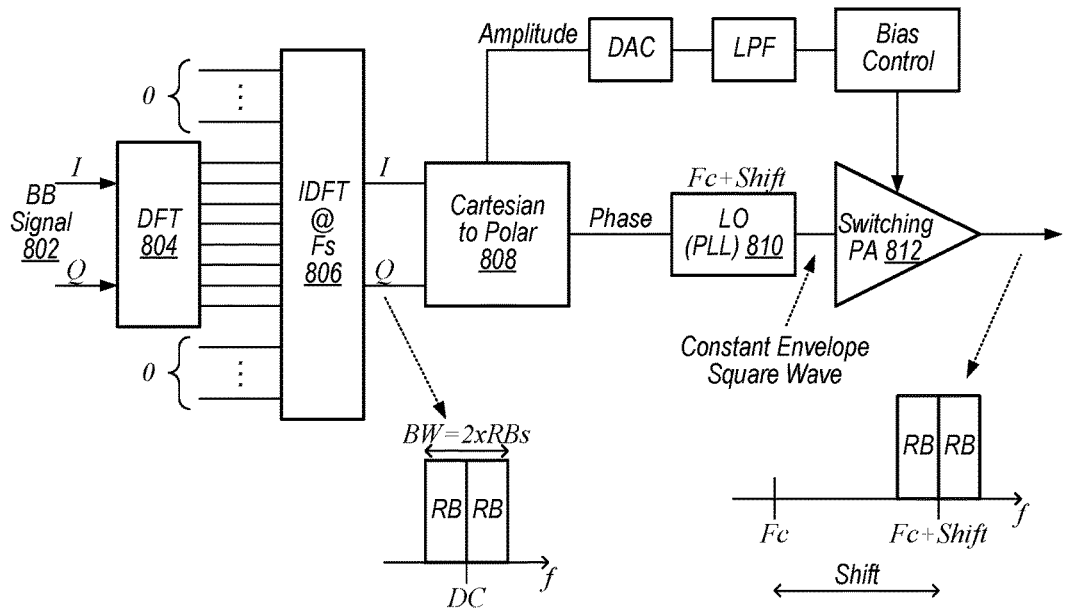

FIG. 8 illustrates a narrowband Polar RF architecture which may be used in conjunction with the baseband configuration illustrated in and described with respect to FIG. 6. As shown, a baseband signal 802 is input to a DFT block 804 and remains located around DC as it is input to the IDFT block 806. Polar modulation works with baseband phase and amplitude signals (e.g., as opposed to Cartesian architecture working with in-phase (I) and quadrature (Q) components). Cartesian to Polar transformation 808 may be processed with a coordinate rotation digital computer (CORDIC), if desired. In this case, digital to analog conversion (DAC) and quadrature mixers may not be required for up-conversion of the phase signal to RF; a switching power amplifier 812 driven by a phase locked loop (PLL) 810 output having constant envelope, only phase modulation may be used. Note that the PLL 810 may be analog or digital.

Figure 9:
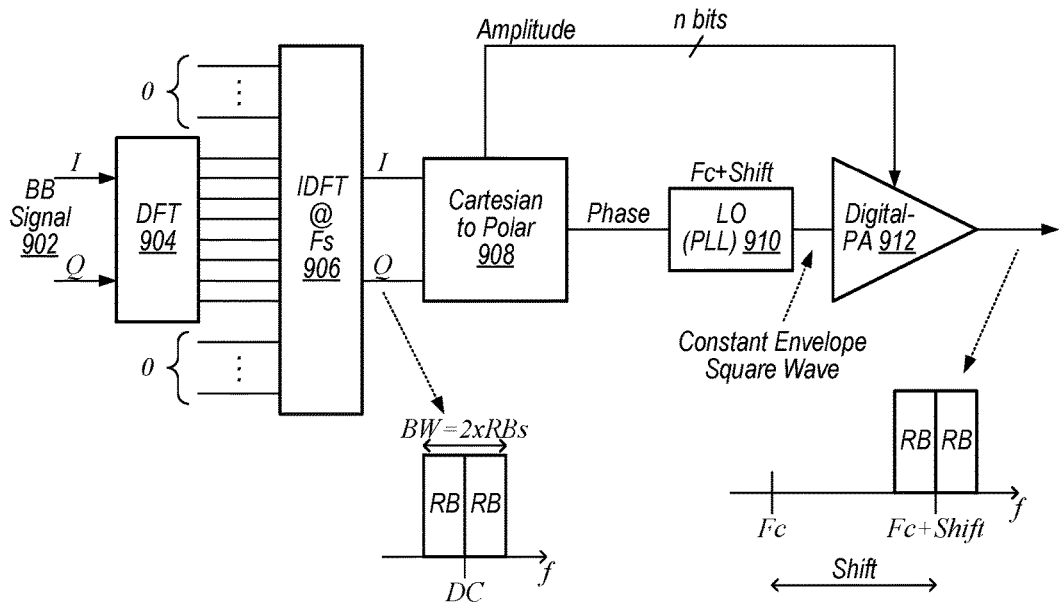

FIG. 9 illustrates an alternate narrowband polar RF architecture which may be used in conjunction with the baseband configuration illustrated in and described with respect to FIG. 6. Similar to FIGS. 6-8, as shown, a baseband signal 902 is input to a DFT block 904 and remains located around DC as it is input to the IDFT block 906. In this case, the baseband phase signal may be handled similarly as illustrated in and described with respect to FIG. 8 (e.g., undergoing Cartesian to Polar transformation 908 and being up-converted using a digital or analog PLL 910), but the amplitude may be coded digitally on n bits (e.g., instead of being converted to analog) and may control a digital power amplifier 912 (e.g., current cells, switched-capacitor PA, etc.). Note that an architecture such as illustrated in FIG. 9 may be implemented as an integrated digital solution, for example on a single CMOS chip, among various possibilities, if desired.

Figure 10:
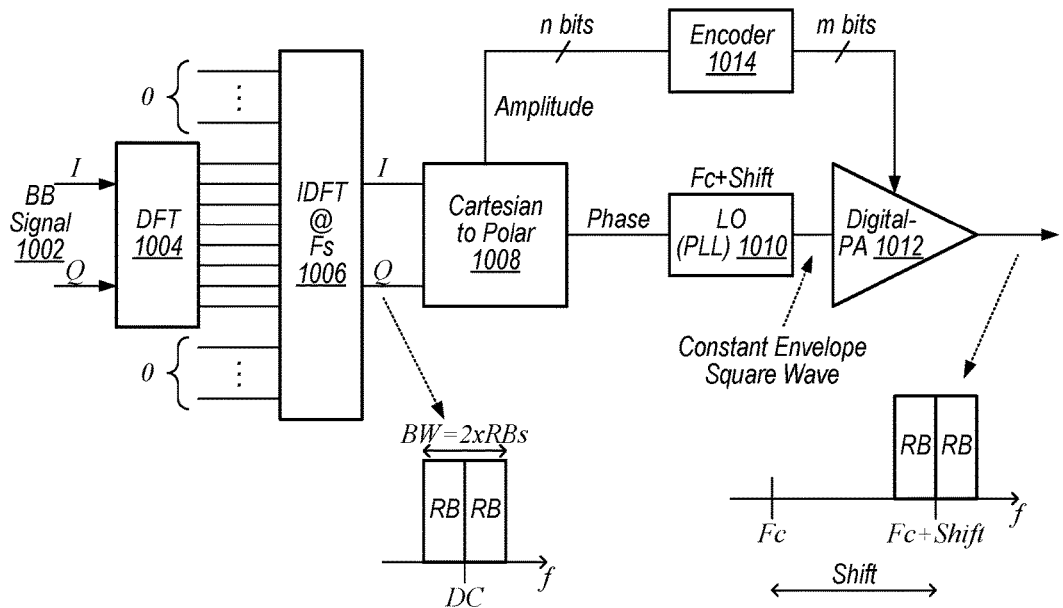

FIG. 10 illustrates a further alternate narrowband polar RF architecture which may be used in conjunction with the baseband configuration illustrated in and described with respect to FIG. 6. As shown, the architecture illustrated in FIG. 10 may be similar to the architecture illustrated in FIG. 9 (e.g., including BB signal 1002 being input to DFT block 1004, then passed to IDFT block 1006, then undergoing Cartesian to Polar transformation 1008, with the baseband phase portion being up-converted using a digital or analog PLL 1010), except that an encoder 1014 may be inserted to modify the amplitude signal before attacking the digital PA 1012, such that from the n-bit input to the encoder 1014, an m-bit output may be used to drive the digital PA 1012. Any of various types of encoding may be used, including but not limited to delta-sigma modulation, thermometric, dynamic element matching, or any other desired type of encoding. Such encoding may be used to optimize and/or relax the design of the digital PA 1012 (e.g., reduce the number of cells in the digital PA for lower complexity and/or more efficient power usage).

Figure 11:
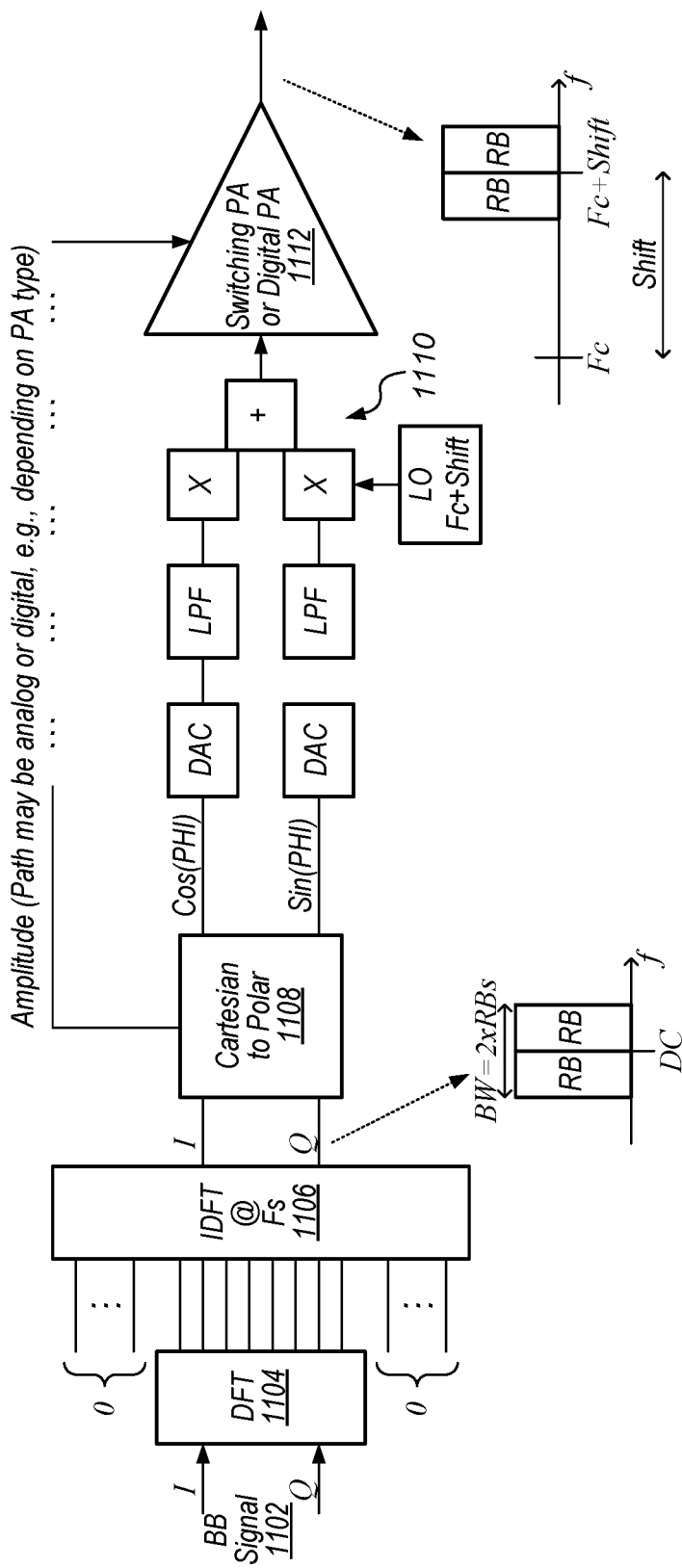

FIG. 11 illustrates a wideband polar RF architecture which may be used in conjunction with the baseband configuration illustrated in and described with respect to FIG. 6. Similar to FIGS. 6-10, according to the architecture of FIG. 11 a baseband signal 1102 is input to a DFT block 1104 and remains located around DC as it is input to the IDFT block 1106. Cartesian to Polar transformation 1108 may also occur. However, while a PLL (such as used in conjunction with the architectures illustrated in FIGS. 8-10) may be used to provide a narrowband RF architecture, if the baseband signal is too wideband, a PLL may not be able to handle the signal. For example, although two (or higher) point injection may be used to increase the functional signal bandwidth which a PLL can handle, there may be a bandwidth limit beyond which it is not practical to use a PLL. Accordingly, in such a case (as illustrated in FIG. 11) the PLL may be replaced by a classical quadrature mixer 1110 to up-convert the phase signal to RF for driving a switching or digital PA. The amplitude path may be analog or digital, and may be as illustrated in any of FIG. 8, 9, or 10, depending on whether a switching or driving PA 1112 is implemented and whether encoding of the amplitude signal is desired.

Figure 12:
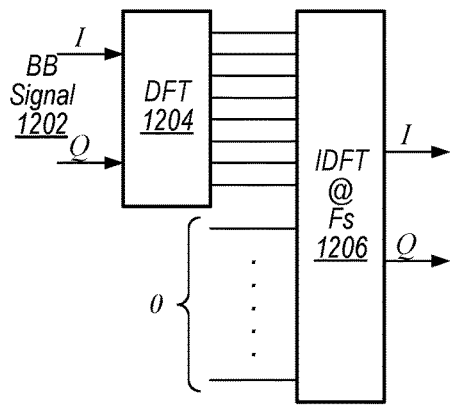

FIGS. 12-15 illustrate further the contrast between performing a frequency shift in the frequency domain and in the time domain, as well as further possibilities for architecture modifications. FIG. 12 illustrates a classical SC-FDMA arrangement in which the baseband signal 1202 is shifted in the frequency domain such that the useful signal is not centered around DC after IDFT 1206. In this case, in order to be able to perform the frequency shift of the RBs and to place the control channels in the frequency domain before the IDFT 1206, the IDFT 1206 size is greater than the DFT 1204 size. Accordingly, to get the same frequency solution (i.e., the same subcarrier spacing), the IDFT 1206 sampling rate may accordingly be higher than the DFT 1204 sampling rate. As a result, the peak-to-average-power (PAPR) ratio of the original baseband signal may be increased, impacting the transmit linearity.

Figure 13:
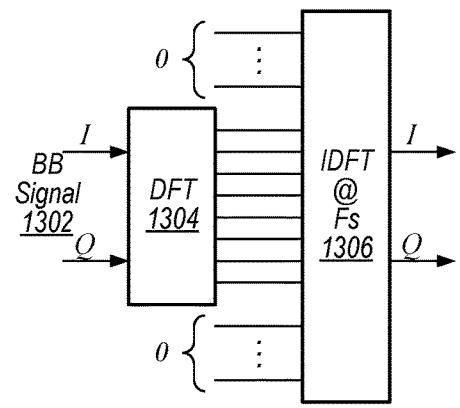

FIG. 13 illustrates an SC-FDMA arrangement in which the baseband signal 1302 is not shifted in the frequency domain such that the useful signal is centered around DC after IDFT 1306, as might be the case if the frequency shift were to be performed in the time domain by a LO in the RF front end, for example. Note that since in such a case, since the RBs and the control channels are centered around DC, and the frequency shift is performed in the temporal domain after the IDFT 1306, it may be possible for the IDFT 1306 and the DFT 1304 blocks to be the same size and have the same sampling rate.

Figure 14:
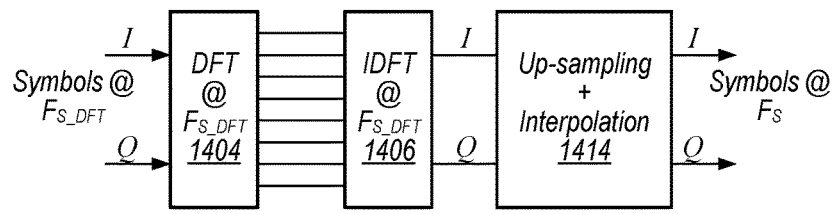

Such an arrangement with DFT 1404 and IDFT 1406 having the same size is illustrated in FIG. 14. In this case, up-sampling (and possibly interpolation) 1414 may be needed after the IDFT 1406 in order to achieve the final sampling rate Fs.

Figure 15:
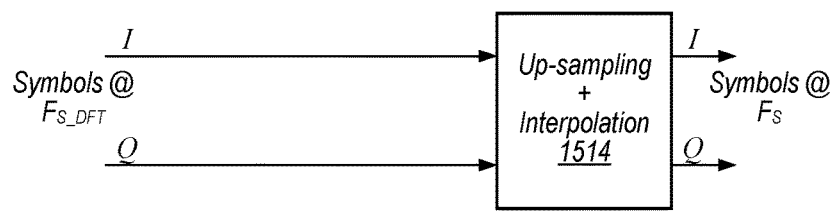

Furthermore, since the DFT and the IDFT in such a case would have the same length, they may effectively cancel each other out, and may be discarded altogether as extraneous. FIG. 15 illustrates such an arrangement, in which baseband SC-FDMA signal is not subject to DFT or IDFT, but is simply provided to an up-sampling and interpolation block 1514 to generate a signal having the final sampling rate Fs before being provided to the RF front end.

In the following further exemplary embodiments are provided.

One set of embodiments may include a method for operating a wireless user equipment (UE) device, the method comprising: establishing a cell according to LTE with a cellular base station on a frequency channel; receiving an uplink grant for uplink LTE communication with the cellular base station, wherein the uplink grant comprises an allocation of resource blocks (RBs) for a single carrier frequency division multiple access (SC-FDMA) uplink transmission, wherein the allocation of RBs is located around a frequency different than the center frequency of the channel; generating a baseband SC-FDMA signal having a bandwidth based on a number of RBs allocated; up-converting the baseband SC-FDMA signal at the frequency around which the allocation of RBs is located to generate an RF SC-FDMA signal; and performing the uplink LTE communication with the cellular base station on the cell, comprising transmitting the RF SC-FDMA signal.

According to some embodiments, up-converting the baseband SC-FDMA signal is performed using a Cartesian RF architecture including quadrature mixing, a local oscillator (LO), and envelope tracking.

According to some embodiments, up-converting the SC-FDMA signal is performed using a Polar RF architecture including a phase locked loop (PLL).

According to some embodiments, the method further comprises: amplifying the RF SC-FDMA signal prior to transmitting the RF SC-FDMA signal using a switching power amplifier or a digital power amplifier.

According to some embodiments, the method further comprises: encoding an amplitude portion of the SC-FDMA signal; and amplifying the RF SC-FDMA signal prior to transmitting the RF SC-FDMA signal according to the encoded amplitude portion of the SC-FDMA signal using a digital power amplifier.

According to some embodiments, the method further comprises: converting the baseband SC-FDMA signal from Cartesian to Polar modulation;

up-converting the phase portion of the converted SC-FDMA signal using a phase locked loop (PLL) or quadrature mixing; and amplifying the up-converted phase portion of the SC-FDMA signal according to the amplitude portion of the converted SC-FDMA signal using a switching or digital power amplifier.

According to some embodiments, generating the baseband SC-FDMA signal does not include performing a Fourier transform or inverse Fourier transform, wherein the method further comprises: performing up-sampling and interpolation of the baseband SC-FDMA signal to modify the sampling rate of the baseband SC-FDMA signal prior to up-converting the baseband SC-FDMA signal.

Another set of embodiments may include a method, comprising: determining frequency resources allocated for a transmission, wherein the allocated frequency resources comprise a signal bandwidth located around a frequency, wherein the signal bandwidth is less than a channel bandwidth of a frequency channel on which the transmission is to be performed, wherein the frequency is offset from a center frequency of the frequency channel; generating a baseband signal including the signal bandwidth located around a first baseband frequency corresponding to the frequency, wherein a second baseband frequency corresponding to the center frequency of the frequency channel is offset from the first baseband frequency; performing up-conversion of the baseband signal using a local oscillator (LO) tuned to the frequency which is offset from the center frequency of the frequency channel to generate an RF signal; and transmitting the RF signal.

Yet another set of embodiments may include a wireless user equipment (UE) device, comprising: a radio; and a processing element; wherein the radio and the processing element are configured to perform any or all parts of any of the methods of the preceding examples.

A further exemplary set of embodiments may include a non-transitory computer accessible memory medium comprising program instructions which, when executed at a device, cause the device to implement any or all parts of any of the methods of the preceding examples.

A still further exemplary set of embodiments may include a computer program comprising instructions for performing any or all parts of any of the methods of the preceding examples.

Yet another exemplary set of embodiments may include an apparatus comprising means for performing any or all of the method elements of any of the preceding examples.

In addition to the above-described exemplary embodiments, further embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for operating a wireless user equipment (UE) device, the method comprising:
    establishing a cell according to LTE with a cellular base station on a frequency channel;
    receiving an uplink grant for uplink LTE communication with the cellular base station, wherein the uplink grant comprises an allocation of resource blocks (RBs) for a single carrier frequency division multiple access (SC-FDMA) uplink transmission, wherein the allocation of RBs is located around a frequency different than a center frequency of the frequency channel;
    generating a baseband SC-FDMA signal having a bandwidth based on a number of RBs allocated;
    up-converting the baseband SC-FDMA signal at the frequency around which the allocation of RBs is located to generate an RF SC-FDMA signal; and
    performing the uplink LTE communication with the cellular base station on the cell, comprising transmitting the RF SC-FDMA signal.

2. The method of claim 1,
    wherein up-converting the baseband SC-FDMA signal is performed using a Cartesian RF architecture including quadrature mixing, a local oscillator (LO), and envelope tracking.

3. The method of claim 1,
    wherein up-converting the baseband SC-FDMA signal is performed using a Polar RF architecture including a phase locked loop (PLL).

4. The method of claim 3, the method further comprising:
    amplifying the RF SC-FDMA signal prior to transmitting the RF SC-FDMA signal using a switching power amplifier or a digital power amplifier.

5. The method of claim 3, the method further comprising:
    encoding an amplitude portion of the RF SC-FDMA signal; and
    amplifying the RF SC-FDMA signal prior to transmitting the RF SC-FDMA signal according to the encoded amplitude portion of the RF SC-FDMA signal using a digital power amplifier.

6. The method of claim 1, the method further comprising:
    converting the baseband SC-FDMA signal from Cartesian to Polar modulation;
    up-converting a phase portion of the converted SC-FDMA signal using a phase locked loop (PLL) or quadrature mixing; and
    amplifying the up-converted phase portion of the SC-FDMA signal according to an amplitude portion of the converted SC-FDMA signal using a switching or digital power amplifier.

7. The method of claim 1, wherein generating the baseband SC-FDMA signal does not include performing a Fourier transform or inverse Fourier transform, wherein the method further comprises:
    performing up-sampling and interpolation of the baseband SC-FDMA signal to modify the sampling rate of the baseband SC-FDMA signal prior to up-converting the baseband SC-FDMA signal.

8. An integrated circuit (IC), comprising circuitry configured to:
    determine frequency resources allocated for a transmission, wherein the allocated frequency resources comprise a signal bandwidth located around a frequency, wherein the signal bandwidth is less than a channel bandwidth of a frequency channel of the transmission, wherein the frequency is offset from a center frequency of the frequency channel;

generate a baseband signal including the signal bandwidth located around a first baseband frequency corresponding to the frequency, wherein a second baseband frequency corresponding to the center frequency of the frequency channel is offset from the first baseband frequency; and perform up-conversion of the baseband signal at the frequency which is offset from the center frequency of the frequency channel to generate an RF signal, wherein performing up-conversion of the baseband signal comprises: converting the baseband signal from Cartesian to Polar modulation, producing a baseband phase portion and an amplitude portion, and up-converting the baseband phase portion to an RF phase portion;

wherein the RF signal is configured for wireless transmission.

9. The IC of claim 8, wherein the circuitry is further configured to:

encode the amplitude portion using one or more of:
delta-sigma modulation encoding;
thermometric encoding;
dynamic element matching;
wherein the RF phase portion is amplified according to the encoded amplitude portion.

10. The IC of claim 8, wherein the circuitry is further configured to:

perform up-sampling and interpolation on the baseband signal without Fourier transform or inverse Fourier transform to modify a sampling rate of the baseband signal prior to performing upconversion of the baseband signal.

11. The IC of claim 8, wherein the IC comprises a complementary metal oxide semiconductor (CMOS) chip, wherein the circuitry configured to determine the frequency resources allocated for the transmission, generate the baseband signal, and perform up-conversion comprises digital baseband and RF circuitry.

12. The IC of claim 8, wherein one of a phase locked loop (PLL) or quadrature mixing is used to up-convert the baseband phase portion to the RF phase portion, wherein one or more of a switching power amplifier or a digital power amplifier are used to amplify the RF phase portion.

13. The IC of claim 8, wherein the circuitry is further configured to:

perform up-sampling and interpolation of the baseband signal to modify a sampling rate of the baseband signal prior to performing up-conversion of the baseband signal.

14. An integrated circuit (IC), comprising circuitry configured to:

establish a cell according to LTE with a cellular base station on a frequency channel;

receive an uplink grant for uplink LTE communication with the cellular base station, wherein the uplink grant comprises an allocation of resource blocks (RBs) for a single carrier frequency division multiple access (SC-FDMA) uplink transmission, wherein the allocation of RBs is located around a frequency different than a center frequency of the frequency channel;

generate a baseband SC-FDMA signal having a bandwidth based on a number of RBs allocated;

up-convert the baseband SC-FDMA signal at the frequency around which the allocation of RBs is located to generate an RF SC-FDMA signal; and perform the uplink LTE communication with the cellular base station on the cell, comprising transmitting the RF SC-FDMA signal.

15. The IC of claim 14, wherein up-converting the baseband SC-FDMA signal is performed using a Cartesian RF architecture including quadrature mixing, a local oscillator (LO), and envelope tracking.

16. The IC of claim 14, wherein up-converting the baseband SC-FDMA signal is performed using a Polar RF architecture including a phase locked loop (PLL).

17. The IC of claim 16, wherein the circuitry is further configured to:

amplify the RF SC-FDMA signal prior to transmitting the RF SC-FDMA signal using a switching power amplifier or a digital power amplifier.

18. The IC of claim 16, wherein the circuitry is further configured to:

encode an amplitude portion of the RF SC-FDMA signal; and amplify the RF SC-FDMA signal prior to transmitting the RF SC-FDMA signal according to the encoded amplitude portion of the RF SC-FDMA signal using a digital power amplifier.

19. The IC of claim 14, wherein the circuitry is further configured to:

convert the baseband SC-FDMA signal from Cartesian to Polar modulation;

up-convert a phase portion of the converted SC-FDMA signal using a phase locked loop (PLL) or quadrature mixing; and amplify the up-converted phase portion of the SC-FDMA signal according to an amplitude portion of the converted SC-FDMA signal using a switching or digital power amplifier.

20. The IC of claim 14, wherein generating the baseband SC-FDMA signal does not include performing a Fourier transform or inverse Fourier transform, wherein the circuitry is further configured to:

perform up-sampling and interpolation of the baseband SC-FDMA signal to modify the sampling rate of the baseband SC-FDMA signal prior to up-converting the baseband SC-FDMA signal.

21. A mobile device, comprising:

wireless communication circuitry; and one or more processing elements coupled to the wireless communication circuitry, wherein the one or more processing elements are configured to:

determine frequency resources allocated for a transmission, wherein the allocated frequency resources comprise a signal bandwidth located around a frequency, wherein the signal bandwidth is less than a channel bandwidth of a frequency channel of the transmission, wherein the frequency is offset from a center frequency of the frequency channel;

generate a baseband signal including the signal bandwidth located around a first baseband frequency corresponding to the frequency, wherein a second baseband frequency corresponding to the center frequency of the frequency channel is offset from the first baseband frequency; and perform up-conversion of the baseband signal at the frequency which is offset from the center frequency of the frequency channel to generate an RF signal, wherein performing up-conversion of the baseband signal comprises: converting the baseband signal from Cartesian to Polar modulation, producing a baseband phase portion and an amplitude portion, and up-converting the baseband phase portion to an RF phase portion;

wherein the RF signal is configured for wireless transmission.

22. The mobile device of claim 21, wherein the one or more processing elements are further configured to:

perform up-sampling and interpolation of the baseband signal to modify a sampling rate of the baseband signal prior to performing up-conversion of the baseband signal.

23. A mobile device, comprising:

wireless communication circuitry; and one or more processing elements coupled to the wireless communication circuitry, wherein the one or more processing elements are configured to:

establish a cell according to LTE with a cellular base station on a frequency channel;

receive an uplink grant for uplink LTE communication with the cellular base station, wherein the uplink grant comprises an allocation of resource blocks (RBs) for a single carrier frequency division multiple access (SC-FDMA) uplink transmission, wherein the allocation of RBs is located around a frequency different than a center frequency of the frequency channel;

generate a baseband SC-FDMA signal having a bandwidth based on a number of RBs allocated;

up-convert the baseband SC-FDMA signal at the frequency around which the allocation of RBs is located to generate an RF SC-FDMA signal; and perform the uplink LTE communication with the cellular base station on the cell, comprising transmitting the RF SC-FDMA signal.

24. The mobile device of claim 23, wherein the one or more processing elements are further configured to: convert the baseband SC-FDMA signal from Cartesian to Polar modulation; up-convert a phase portion of the converted SC-FDMA signal using a phase locked loop (PLL) or quadrature mixing; and amplify the up-converted phase portion of the SC-FDMA signal according to an amplitude portion of the converted SC-FDMA signal using a switching or digital power amplifier.

25. The mobile device of claim 23, wherein generating the baseband SC-FDMA signal does not include performing a Fourier transform or inverse Fourier transform, wherein the one or more processing elements are further configured to: perform up-sampling and interpolation of the baseband SC-FDMA signal to modify the sampling rate of the baseband SC-FDMA signal prior to up-converting the baseband SC-FDMA signal.

* * * * *